United States Patent [19]

Ashworth

[11] Patent Number: 4,536,009

[45] Date of Patent: Aug. 20, 1985

[54] VEHICLE STABILIZING SYSTEM

[75] Inventor: Denis H. Ashworth, Wombourne, England

[73] Assignee: Simon Engineering Dudley Limited, Dudley, England

[21] Appl. No.: 497,706

[22] Filed: May 24, 1983

[30] Foreign Application Priority Data

| | | | |
|---|---|---|---|
| May 28, 1982 | [GB] | United Kingdom | 8215679 |
| Oct. 29, 1982 | [GB] | United Kingdom | 8230980 |

[51] Int. Cl.$^3$ .......... B60S 9/04; B60S 9/10

[52] U.S. Cl. .......... 280/755; 212/189; 254/422; 280/764.1

[58] Field of Search .......... 280/755, 756, 754, 761, 280/763.1, 764, 764.1; 180/313, 79, 199, 203, 219, 7.1; 212/189; 254/422

[56] References Cited

U.S. PATENT DOCUMENTS

| | | | |
|---|---|---|---|
| 850,302 | 4/1907 | Greaser et al. | 254/422 |
| 1,373,790 | 4/1921 | Becker | 180/201 |
| 1,857,611 | 5/1932 | Swift | 280/764.1 |
| 2,143,184 | 1/1939 | Barr | 280/761 |
| 2,267,856 | 12/1941 | DiCarlo | 254/422 |
| 2,666,619 | 1/1954 | Bloom | 280/754 X |
| 2,891,682 | 6/1959 | Graham | 212/189 |
| 3,857,582 | 12/1974 | Hartog | 280/764.1 |

FOREIGN PATENT DOCUMENTS

| | | | |
|---|---|---|---|
| 20245 | 5/1956 | Fed. Rep. of Germany | 180/7.1 |
| 256716 | 1/1928 | Italy | 254/422 |
| 685567 | 3/1965 | Italy | 280/764.1 |

*Primary Examiner*—Joseph F. Peters, Jr.
*Assistant Examiner*—Mitchell J. Hill
*Attorney, Agent, or Firm*—LeBlanc, Nolan, Shur & Nies

[57] ABSTRACT

A stabilizing system for a vehicle carrying a load supporting platform (10), to prevent the platform from tilting when the load is unevenly distributed about the longitudinal center line of the vehicle, the system comprising a pair of jacks (17) which are pivotally attached to the platform (10) at the sides thereof outside the adjacent wheels (15). The jacks carry inwardly extending foot plates (18). The jacks are lowered behind the vehicle wheels which are then driven in reverse so that the tires ride up onto the foot plates (18). In this position the jacks extend vertically to the ground and support their associated wheels thus limiting the tilting of the platform (10). A control device (20, 19) is provided to withdraw the jacks to their inoperative positions for travelling upon forward movement of the vehicle. The stabilizing system is self-engaging by reversing the vehicle after releasing the jacks.

11 Claims, 7 Drawing Figures

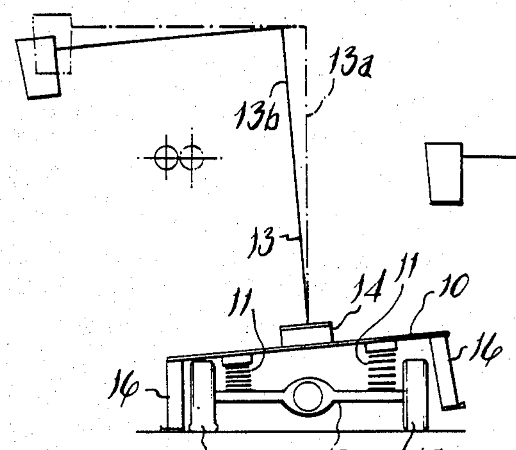
FIG.1
FIG.2
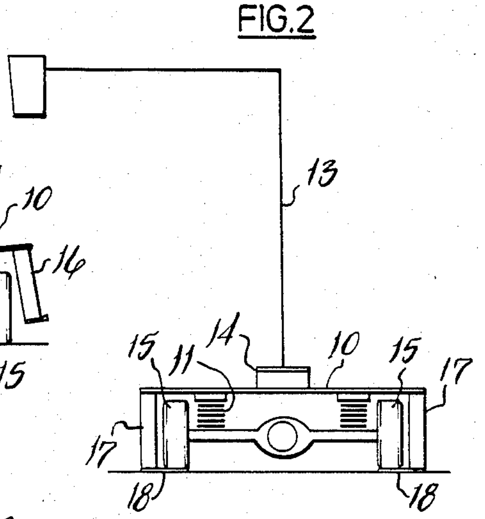
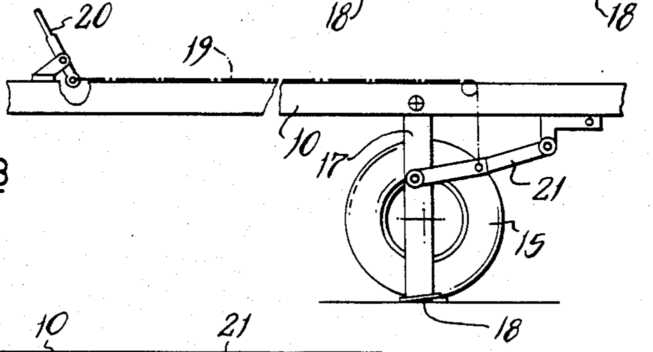
FIG.3
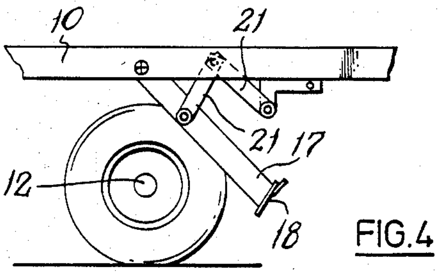
FIG.4

VEHICLE STABILIZING SYSTEM

This invention relates to a stabilizing system for a vehicle carrying a load-supporting platform, to prevent the platform from tilting when the load is unevenly distributed about the centre line of the vehicle. The invention is particularly, through by no means exclusively, concerned with a vehicle on which the load is manoeuvrable about the centre line of the vehicle, for example on a turntable. Typical of this kind of vehicle are hydraulically elevatable access platforms having an articulated boom system rotatable upon a turntable, and cranes where the jib is again rotatable and may swing outwardly beyond the sides of the vehicle platform.

Several known devices are used to stablize such vehicles when the load is off-centre, and these include a set of jacks which extend downwardly from the platform into contact with the ground, and so-called axle locks which maintain a fixed relationship between the vehicle axles and the platform. These devices are expensive in manufacture and in the case of jacks are usually hydraulically driven thus requiring extra power from the vehicle. Devices of this kind do not completely overcome the problem of stability since when the load is maneuvred off-centre, the weight acting on the springs is unevenly distributed about the centre line of the vehicle. Thus, the springs on the side remote from that towards which the load has been manoeuvred are relieved thus enabling those springs to extend which actually increases the overturning moment applied to the vehicle. This difficulty is overcome by the use of an axle lock, but again the weight acting on the vehicle tires is unevenly distributed giving rise to a certain degree of instability.

An object of the present invention is to provide a system for stabilizing the vehicle where the relative dispositions of the platform and the axle are maintained constant and the vehicle tires are prevented from being compressed unevenly. The system is rendered operative not by the use of extra hydraulic power but merely by appropriate movement of the vehicle itself.

According to the present invention there is provided a stabilizing system on a vehicle carrying a load-supporting platform, to prevent the platform from tilting when the load is moved relative to the vehicle, the system comprising at least one leg having one end pivotally attached to the platform at a side thereof generally above one of the vehicle wheels and the other end free to be lowered from an inoperative or travelling position in which said free end is raised above the ground, towards an operative position in which the leg depends substantially vertically between the platform and the ground outside said one of the vehicle wheels, the leg including at said free end a foot plate which extends inwardly such that when the leg is lowered towards said operative position, the foot plate is located closely adjacent the tire of said one of the vehicle wheels and closely adjacent the ground, and upon driving the vehicle in the appropriate direction said tire automatically rides up onto said foot plate to engage the leg in its operative position in which said one of the vehicle wheels rests directy upon said footplate to be supported thereby.

Preferably means are provided to prevent the vehicle from rolling or being driven away when the system is in the said operative position.

Embodiments of the invention will now be described, by way of example, with reference to the accompanying drawings, in which:

FIG. 1 illustrates schematically a condition of instability which arises in a vehicle not including a stabilizing system in accordance with the invention;

FIG. 2 similarly illustrates a vehicle incorporating such a system;

FIG. 3 is a more detailed side view of a form of stabilization system on a vehicle, in its operative position;

FIG. 4 is a view similar to FIG. 3 showing the system in its inoperative position;

Figure 7:
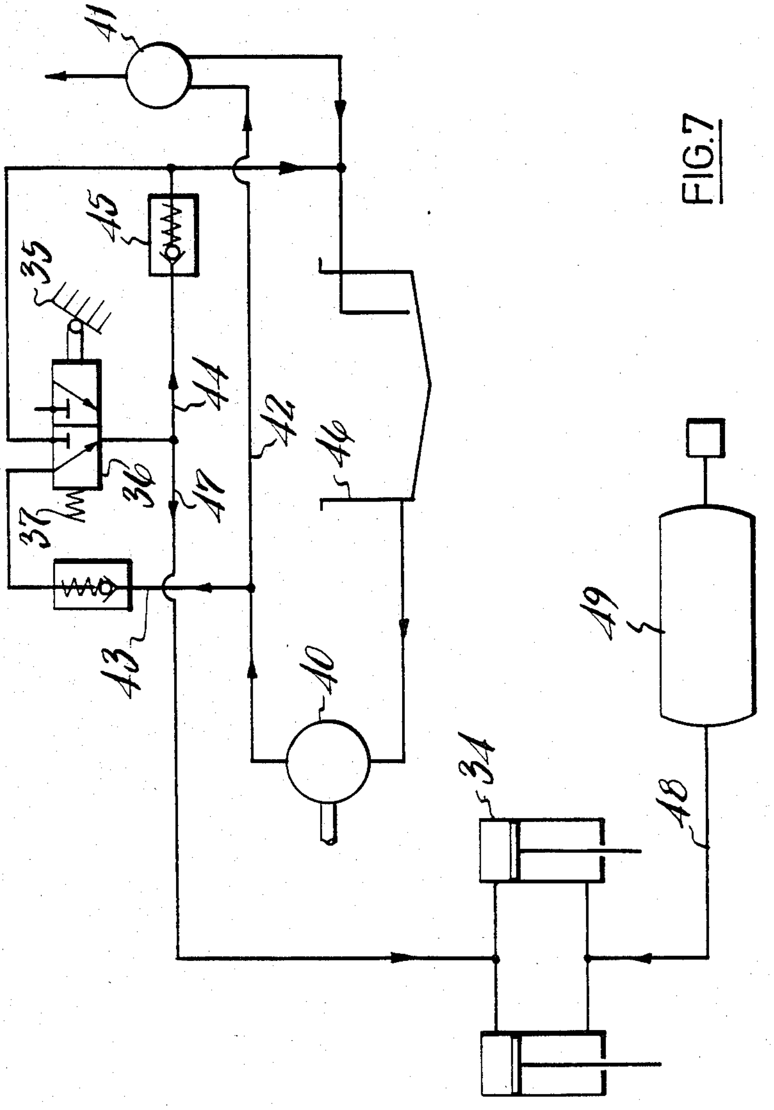

and FIG. 7 is a hydraulic/pneumatic circuit diagram.

Referring now to FIG. 1, it will be seen that in a vehicle having a platform 10 mounted by suspension springs 11 relative to the axles 12 and having an articulated boom system 13 mounted for rotation on a turntable 14, when the boom system is swung outwardly to one side of the vehicle, the load applied to the springs 11 is unevenly distributed so that, in the drawing, the right-hand spring is permitted to extend thus shifting the centre of gravity of the boom system 13 from position A to position B. Similarly, the boom system shifts from position 13*a* to position 13*b*. Thus the overturning moment increases and the vehicle becomes less stable. Also of course there is uneven distribution of weight on the tires 15 so that this again contributes to the instability of the vehicle. The normal ground engaging jacks 16 are not ideal for maintaining stability.

An axle lock to prevent relative displacement of the platform 10 and the axle 12 would assist in overcoming this problem but does not obviate the uneven distribution of load on the tires.

Referring now to FIG. 2, where like parts are denoted by like reference numerals, and in accordance with the invention, a pair of ground engaging jacks 17 depending from the platform 10 outside the adjacent vehicle wheels, include a pair of foot plates 18 attached to the lower ends of the jacks 17 and extending inwardly so that in an operative position they are disposed beneath the tires 15 of the wheels of the vehicle. Thus, by the simple expedient of locking the platform relative to the tires it is impossible for the platform to tilt without also having to lift the tires off the ground at one side.

Referring now to FIGS. 3 and 4 it will be seen that the jacks 17 are pivotally attached at their upper ends to the platform 10. In the travelling or inoperative position they are raised above the ground behind the adjacent wheels as illustrated in FIG. 4 and maintained by any suitable means such as the cable 19 illustrated in FIG. 3. This is shown in its simplest form operated by a lever 20 located, for example, in the driver's cab.

When it is required to place the stabilizing system in the operative position, the cable 19 is released allowing the jacks to descend to the ground, behind the wheels whereupon, by backing up the vehicle the tires 15 automatically ride up onto the foot plates 18 until the jacks 17 reach the vertical position illustrated in FIG. 3 wherein they are locked, and the wheels are supported by the foot plates. Since the pivotal connection of the jacks 17 to the platform 10 is slightly forward of the axle 12, the springs 11 assist in maintaining the jacks in the locked position. A pair of pivotted links 21 also may be provided to establish a toggle action which locks the jacks in position until released by operation of the lever 20. The purpose of the links 21 is to prevent the vehicle from being driven away while the jacks are in position, or to prevent the vehicle from rolling off the foot plates if on a downwards slope.

If required further pairs of jacks may be provided behind other wheels of the vehicle and actuated by horizontal links connected to the jacks 17 in the form of a simple parallelogram system. Such an arrangement could provide a means of demounting the platform from the vehicle chassis, as the jacks are outside the wheels. That is, the jacks could be engaged, and by releasing a number of bolts securing the vehicle to the platform 10, the vehicle could be driven away leaving the platform standing on the jacks.

The present system is simple and inexpensive to produce and in operation is self-engaging. The system for releasing and withdrawing the jacks can be as simple as that illustrated or more complex using hydraulic or other mechanical means operable either from the driver's cab or from a position towards the rear of the platform. Such a system will now be described with reference to FIGS. 5 to 7.

In the second embodiment, the jacks one of which is illustrated at 30 are again pivotally attached to the platform 10 and the pivotted links 21 of the embodiment illustrated in FIGS. 3 and 4 are replaced by a further pair of links 31 and 32, one end of the link 31 being pivotted to the associated jack 30 whilst the remote end of link 32 is pivotally connected to a bracket 33 which is fixed to and depends from the platform 10. A hydraulic/pneumatic cylinder 34 extends between the platform 10 and approximately the mid point of link 31. Attached to the upper end of jack 30 is an abutment 35 which when the jack is in its operative position maintains a bypass valve 36 in one of its operative positions against a spring 37.

Referring now to FIG. 7 the hydraulic circuit for elevating and lowering the boom system and for operating the hydraulic/pneumatic cylinders 34 for the jacks, includes a pump 40 which is operated from the driver's cab and supplies hydraulic fluid under pressure to a control valve 41 for the boom system, via a pipe 42. A branch pipe 43 connects the pipe 42 to the bypass valve 36 which in one of its two operative positions permits fluid to pass from pipe 43 into pipe 44 which returns the fluid via a pressurizing valve 45, to the fluid reservoir 46 for the hydraulic system. A further branch pipe 47 connected to pipes 43 and 44 is adapted to supply hydraulic fluid to one end of each jack cylinder 34, whilst the other end of each jack cylinder is fed with compressed air via a pipe 48 from a pressurised tank 49.

Figure 5:
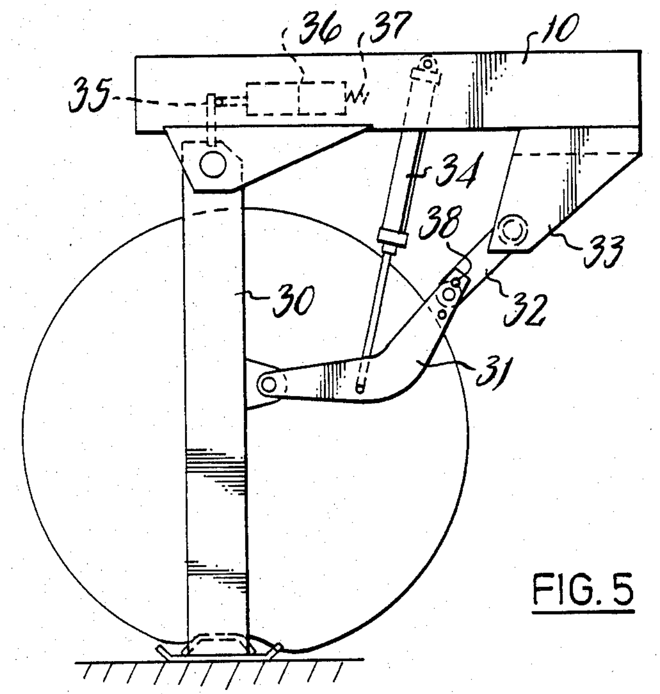
FIG. 5 is a side view of a second form of stabilization system.
Figure 6:
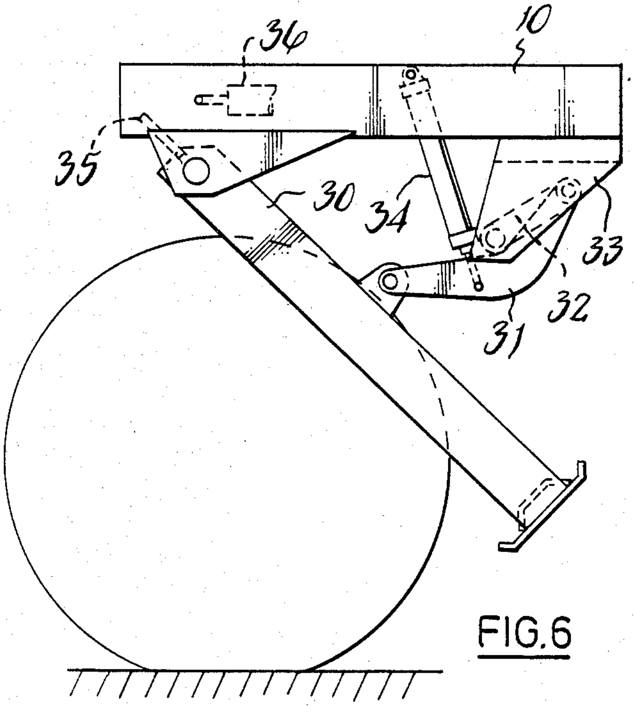
FIG. 6 is a view similar to FIG. 5 showing the system in its inoperative position.

In use, therefore, with the jacks 30 in their inoperative positions as illustrated in FIG. 6, operation commences by actuation of the pump 40 to supply fluid into pipes 42 and 43, and since pipes 43 and 44 permit the oil to return to the reservoir 46, the pressure in pipe 42 is insufficient to enable the boom system to be elevated. However, with the bypass valve 36 in the position shown in FIG. 7, the oil passing through the valve 45 provides a low pressure oil supply back along pipe 47 to the cylinders 34 to extend them which causes the links 31 to 32 to be released from the folded position illustrated in FIG. 6 thus allowing the jacks 30 to fall down into place against the vehicle tires. The vehicle is then reversed to cause the jacks to assume the operative position illustrated in FIG. 5. In this position, the abutment 35 operates valve 36 to discontinue flow of hydraulic fluid to the reservoir 46. Consequently the fluid pressure in pipe 42 can increase to drive the boom system via control valve 41. In this condition, the oil in cylinders 34 is free to return by pipes 47 and 44, to the reservoir.

Once the jacks are in their operative positions, a mechanical device such as a spring loaded pin 38 can be engaged between links 31 and 32 to prevent the jacks from being inadvertently retracted such as by attempting to drive away the vehicle or for the vehicle to roll of the jacks on an inclined surface.

When the operation is completed and the booms are returned to their travelling positions the supply of fluid from pump 40 is discontinued, and after removal of the pin 38 the vehicle may be driven away forwardly thus causing the jacks 30 to be released from between the tires and the road surface. In this condition, the air pressure in pipe 48 will cause cylinders 34 to retract thus pulling the jacks 30 into the position shown in FIG. 6. This action enables bypass valve 36 to be returned, under the action of spring 37, to the position shown in FIG. 7 ready for the next operation.

If required, the pin 38 may be hydraulically connected to the system such that it cannot be removed to release links 31 and 32 until pump 40 is turned off, thus to prevent the jacks from being driven downwardly towards the wheels when the vehicle is in motion.

It will be appreciated that the system described in relation to FIGS. 5 and 7 ensures a degree of security in that the boom system cannot be elevated towards an instable position until the jacks are fully operative.

The system is applicable not only to vehicles upon which the load is manoeuvrable about a turntable as illustrated in the drawings, but to any vehicle where it is required to stablize the chassis.

Whilst the system has been described and illustrated with the legs mounted to descend from behind the associated vehicle wheels to a position just in front of the axles thereof, it is possible simply to reverse the relative dispositions of these parts such that each leg descends from a travelling position in front of the vehicle wheel in which case the legs are engaged by driving the vehicle forwards until the wheels ride up forwardly onto the foot plates.

What is claimed is:

1. A stabilizing system on a vehicle carrying a load-supporting platform, to prevent the platform from tilting when the load is moved relative to the vehicle, the system comprising at least one leg having one end pivotally attached to the platform at a side thereof generally above one of the vehicle wheels and the other end free to be lowered from an inoperative or travelling position in which said free end is raised above the ground, towards an operative position in which the leg depends substantially vertically between the platform and the ground outside said one of the vehicle wheels, said leg being pivotally attached to the platform on one side of the vertical plane which contains the rotational axis of said one of the vehicle wheels while the inoperative or travelling position of said leg is on the other side of said vertical plane, said leg being movable across said vertical plane containing said axis, the leg including at said free end a foot plate which extends inwardly such that when the leg is lowered towards said operative position, the foot plate is located closely adjacent the tire of said one of the vehicle wheels and closely adjacent the ground, and upon driving the vehicle in the appropriate direction said tire automatically rides up onto said foot plate to engage the leg in its operative position in which said one of the vehicle wheels rests directly upon said foot plate to be supported thereby.

2. A stabilizing system according to claim 1, in which said leg, in its inoperative or travelling position is located generally behind said one of the vehicle wheels and is lowered to a position in which said foot plate is located behind the tire of said wheel such that upon driving the vehicle in reverse, said tire automatically rides up onto said foot plate to engage the leg in its operative position, there being means to maintain said leg in its inoperative or travelling position.

3. A stabilizing system according to claim 1, wherein said leg is pivotally attached to the platform forward of the rotational axis of said one of the vehicle wheels and is lowered from its inoperative or travelling position behind said wheel, and after engagement, in its operative position is disposed forward of said rotational axis, such that maintaining the leg in said operative position is assisted by suspension springs disposed between said platform and said wheel.

4. A stabilizing system according to claim 1, wherein said leg is maintained in its operative position by means of a pair of links pivotally connected together and to said leg and said platform respectively, means being provided to lock said links in a position in which said leg is maintained in said operative position.

5. A stabilizing system according to claim 4, wherein said pivotted links are adapted to establish a toggle action in order to maintain the leg in its operative position.

6. A stabilizing system according to claim 4, including a cable to release the leg from its travelling position and adapted to release the pivotted links thus enabling the leg to return to its travelling position.

7. A stabilizing system according to claim 2, including a fluidic cylinder pivotally connected to the platform and operatively connected to said leg for moving same with respect to its inoperative or travelling position.

8. A stabilizing system according to claim 7, wherein said fluidic cylinder is extended hydraulically to cause the associated leg to move towards said operative position, and retracted pneumatically to cause it to be returned to said inoperative or travelling position.

9. A stabilizing system according to claim 1, wherein said platform supports an elevatable articulated boom system, and including power means for elevating said system, and further means for preventing elevation of said boom system until said leg is in its operative position, said power means being adapted to drive said leg from its travelling position towards its operative position.

10. A stabilizing system according to claim 9, wherein said means for preventing elevation of the boom system comprises an abutment which when said leg is in its operative position, actuates a further means to permit said power means to elevate the boom system.

11. A stabilizing system according to claim 1, wherein two or more legs are provided and located respectively adjacent two or more wheels of the vehicle.

* * * * *